(12) United States Patent
Campbell

(10) Patent No.: US 7,437,587 B2
(45) Date of Patent: Oct. 14, 2008

(54) METHOD AND SYSTEM FOR UPDATING A VALUE OF A SLOW REGISTER TO A VALUE OF A FAST REGISTER

(75) Inventor: Robert G. Campbell, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 454 days.

(21) Appl. No.: 11/040,756

(22) Filed: Jan. 21, 2005

(65) Prior Publication Data

US 2006/0168465 A1    Jul. 27, 2006

(51) Int. Cl.
*G06F 1/12* (2006.01)
*G06F 1/00* (2006.01)

(52) U.S. Cl. .................. 713/375; 713/400; 713/500

(58) Field of Classification Search .......... 713/375, 713/400, 500
See application file for complete search history.

(56) References Cited

U.S. PATENT DOCUMENTS

| | | | |
|---|---|---|---|
| 5,001,730 A | 3/1991 | Franaszek et al. | |
| 6,389,547 B1 * | 5/2002 | James et al. | 713/400 |
| 6,502,141 B1 | 12/2002 | Rawson, III | |
| 7,093,080 B2 * | 8/2006 | Day et al. | 711/141 |
| 7,213,106 B1 * | 5/2007 | Koster et al. | 711/119 |
| 2002/0129291 A1 * | 9/2002 | Gonzalez | 713/400 |
| 2002/0178292 A1 * | 11/2002 | Mushkin et al. | 709/248 |
| 2006/0047849 A1 * | 3/2006 | Mukherjee | 709/238 |
| 2006/0095684 A1 * | 5/2006 | Shen | 711/146 |

FOREIGN PATENT DOCUMENTS

WO    WO 01/22202    3/2001

* cited by examiner

*Primary Examiner*—Suresh K Suryawanshi

(57) ABSTRACT

Embodiments of the invention relate to synchronizing registers. An embodiment includes a plurality of processing cells each includes a plurality of CPUs, which run at different frequencies and each of which has an ar.itc timer register. A CPU in the fastest cell of the plurality of cells is referred to as the fast CPU. CPUs in slower cells are referred to as slow CPUs. At predetermined time intervals, slow CPUs are provided with the ar.itc value of the fast CPU to replace the values of their ar.itc. As a result, values in the ar.itc registers are synchronized without providing negative time. Other embodiments are also disclosed.

34 Claims, 2 Drawing Sheets

METHOD AND SYSTEM FOR UPDATING A VALUE OF A SLOW REGISTER TO A VALUE OF A FAST REGISTER

FIELD OF THE INVENTION

The present invention relates generally to synchronization of registers in computer systems.

BACKGROUND OF THE INVENTION

Generally, each CPU in multi-CPU computer systems is run by a clock. Depending on implementations, clocks for all CPUs in the system may be provided by one or a plurality of clock sources, but each approach has its own deficiencies. For example, in the single-clock-source approach, a clock source, e.g., a clock generator, provides the clock for all CPUs, and this clock is therefore the same for all CPUs receiving it. However, this approach is subject to single points of failures. That is, for another example, if either the clock generation or distribution fails, then the whole system fails.

In the multi-clock-source approach, such as one in which one clock generator provides a clock for a processing cell in a multi-cell system, all CPUs in a cell receive the same clock from one clock source, but each cell receives a different clock from a different clock source. As a result, if a clock fails, then only the cell using that clock fails, but cells using other clocks can continue to function. Unfortunately, clock drifts in the different clock sources can cause various problems such as the calculation resulting in negative time, or time elapsing backwards. Clock drifts may be referred to as variations in the clock frequency seen by different CPUs. In SMP (Symmetric MultiProcessing) systems, a thread can be initiated by one CPU and subsequently runs on another CPU. For example, if the ar.itc register, which is an application register that contains the value of the interval time counter, is read by a thread running on a fast-clocked CPU, and the thread later migrates to a slow-clocked CPU, then the ar.itc register now running on the slow-clocked CPU could have a value lower than the value from the first read, e.g., the read from the fast-clocked CPU, which would cause elapsed time to be calculated as being negative.

SUMMARY OF THE INVENTION

Embodiments of the invention relate to synchronizing registers. An embodiment includes a plurality of processing cells each includes a plurality of CPUs, which run at different frequencies and each of which has an ar.itc timer register. A CPU in the fastest cell of the plurality of cells is referred to as the fast CPU. CPUs in slower cells are referred to as slow CPUs. At predetermined time intervals, slow CPUs are provided with the ar.itc value of the fast CPU to replace the values of their ar.itc. As a result, values in the ar.itc registers are synchronized without providing negative time. Other embodiments are also disclosed.

BRIEF DESCRIPTION OF THE DRAWINGS

The present invention is illustrated by way of example, and not by way of limitation, in the figures of the accompanying drawings in which like reference numerals refer to similar elements and in which.

DETAILED DESCRIPTION OF VARIOUS EMBODIMENTS

In the following description, for the purposes of explanation, numerous specific details are set forth in order to provide a thorough understanding of the present invention. However, it will be apparent to one skilled in the art that the invention may be practiced without these specific details. In other instances, well-known structures and devices are shown in block diagram form in order to avoid obscuring the invention.

Overview

Figure 1:
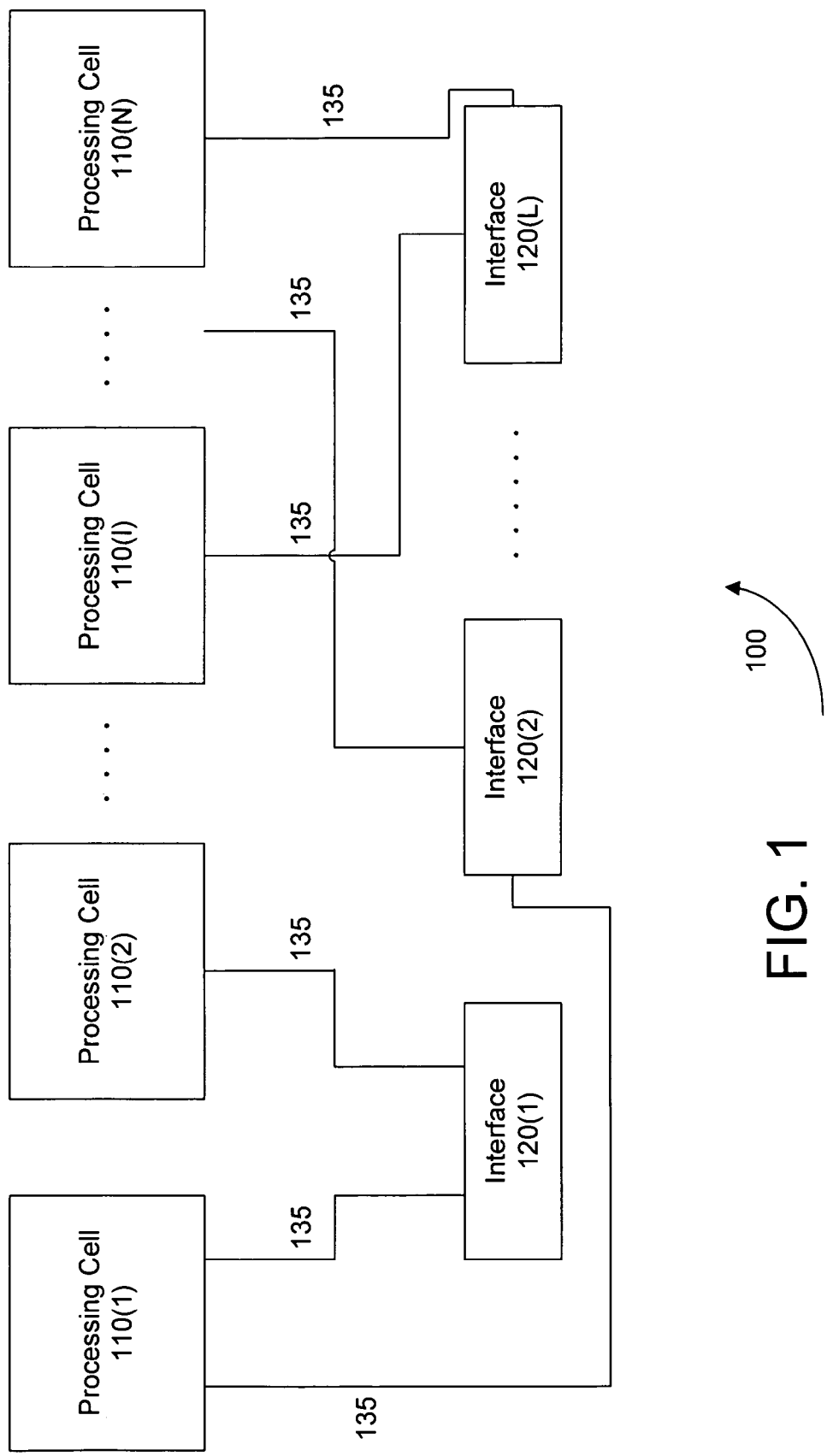
FIG. 1 shows an arrangement upon which embodiments of the invention may be implemented.

FIG. 1 shows an arrangement 100 upon which embodiments of the invention may be implemented. System 100 includes a plurality of processing cells, e.g., cells 110(1) to 110(N) and a plurality of interfaces 120, e.g., interfaces 120(1) to 120(L). System 100 is a SMP (Symmetric MultiProcessing) system in which multiple CPUs can complete individual processes simultaneously. An idle CPU can be assigned any task, and additional CPUs can be added to improve performance and handle increased loads. A thread may be initiated by one CPU and subsequently runs on another CPU. One or a plurality of processing cells 110 may be partitioned to form a system running an operating system. Interfaces 120 enable multiple cells 110 to be connected, and if desired, one or a plurality of connected cells 110 operates as an independent computer system running an operating system image. Generally, the operating system creates processes which own threads. Data is transmitted on frontside bus 135 from one part of a computer to another, e.g., CPU, memory, etc. Embodiments of the invention are independent of the bus topology including topology inside a cell 110 and between cells 110. For example, bus architecture such as sharing, point-to-point, mesh, etc., is within the scope of embodiments of the invention. Those skilled in the art will recognize that frontside bus may be referred to the system bus that connects CPUs to memory, and may also be called memory bus, local bus, host bus, etc. Embodiments of the invention are also applicable to NUMA (Non-Uniform Memory Access) systems in which the memory access time from one cell 110 to another cell 110 is much different, e.g., slower than the memory access time within a cell 110.

Figure 2:
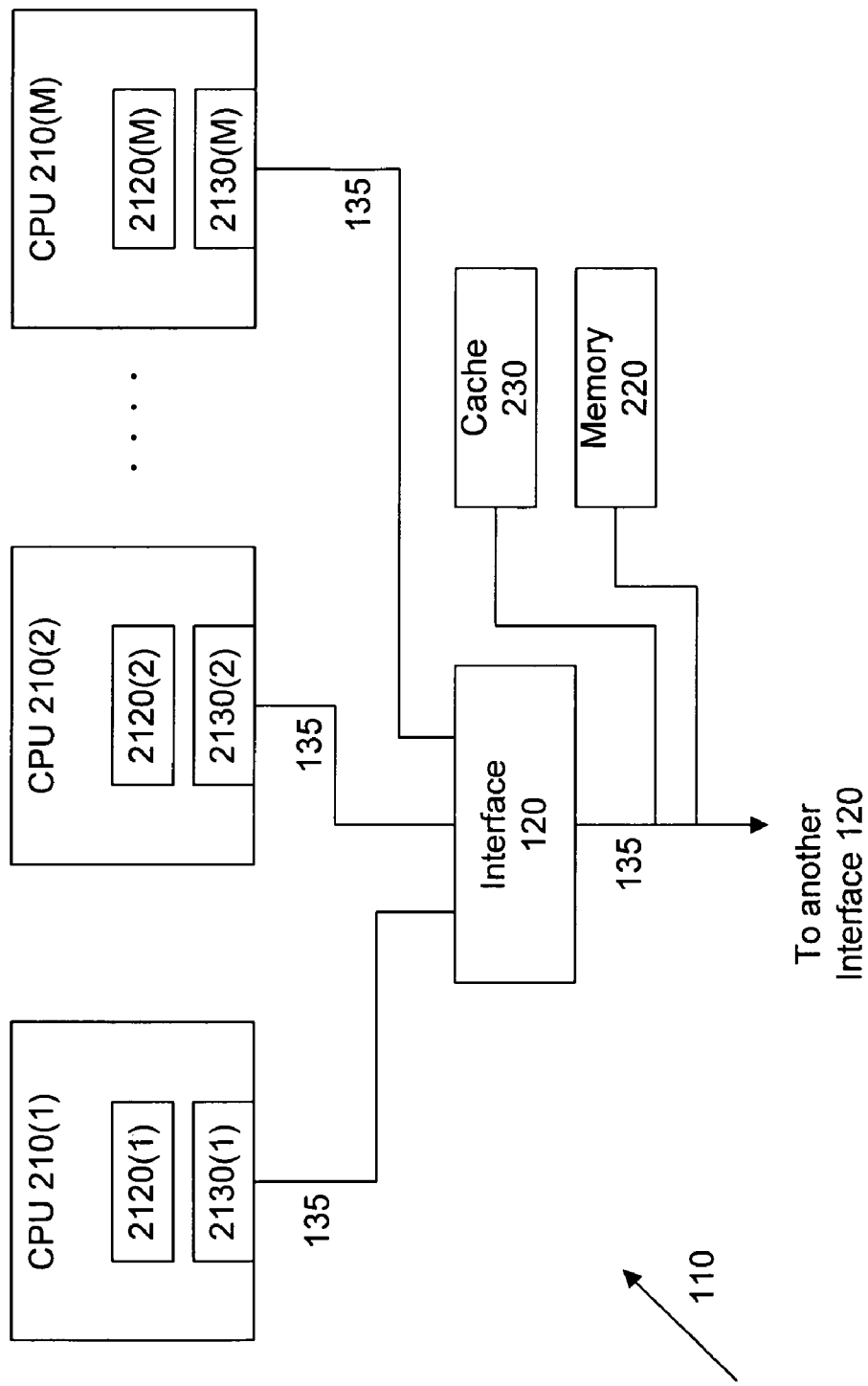
FIG. 2 shows a processing cell of the arrangement of FIG. 1, in accordance with an embodiment of the invention.

FIG. 2 shows a processing cell 200 being an embodiment of a processing cell 110. A processing cell 200 includes a plurality of processors or CPU, e.g., CPU 210(1) to 210(M), memory 220, different levels of caches 230. Generally, it is desirable that each CPU 210 receive clocks having the same frequency, e.g., frequencies of acceptable variations. Depending on configurations, a CPU 210 of a cell 200 may access memory 220 and/or caches 230 of the same cell 200 or of another cell 200.

Each cell 200 receives a clock from a clock source, e.g., a clock generator (not shown). As a result, each CPU 210 in the same cell 200 receives clocks from this same clock source, and CPUs 210 on the same cell 200 run on the same clock frequency. Because of the different clock sources in different cells 200, the clock frequency for CPUs 210 in different cells 200 vary.

A CPU 210 includes registers (not shown) known as temporary storage areas for use by the CPU. The ALU (Arithmetic Logic Unit, not shown) in a CPU uses those registers in operating and manipulating the data while performing its function. One of the registers visible to the ALU is register ar.itc 2120 (Application Register—Interval Time Counter) which is an application register that contains the value of the interval time counter from which time is calculated. In this document register ar.itc is used for illustration purposes, but embodiments of the invention are also applicable to other registers or information storage, including those not visible to the ALU. A CPU 210 also has its own cache 2130 referred to as the CPU cache. For illustration purposes, only one cache 2130 is shown in a CPU 210. However, there may be different levels of cache 2130 internal to such CPU.

Similar to the situation of cache 2130, only one cache 230 is shown in FIG. 2 for illustration purposes. However, there may be one or more caches 230 at different levels between a CPU 210 and memory 230.

Positive Time Provided by Register ar.itc

For illustration purposes, a cell 200 having the fastest clock frequency as compared to the frequency of other cells 200 is referred to as a "fast cell," and other cells 200 having a clock frequency slower than that of the fast cell are referred to as slow cells. A CPU in a fast cell is referred to as a CPU-F while a CPU in a slow cell is referred to as a CPU-S. The ar.itc 2120 of a CPU-F is referred to as the ar.itc-F and the ar.itc 2120 of a CPU-S is referred to as the ar.itc-S. Once the fast cell is identified, a CPU of that cell is tagged as a CPU-F such that the value of its ar.itc-F is tracked to be provided to the slow cells as desired. In embodiments that all CPUs 210 in a cell 200 receive their clocks from the same clock source, the value of ar.itc of all CPUs 210 in the same cell are the same, and any CPU 210 in the fast cell may be tagged as a CPU-F providing the ar.itc-F value.

Generally, it is desirable that the ar.itc value of CPUs 210 in cells 200 increases monotonically. That is, the ar.itc value of a subsequent read is always greater than or equal to the ar.itc value of a prior read. This is done by providing the value of ar.itc-F to the ar.itc-S at a predetermined time interval, which, for illustration purposes, is referred to as the drift interval. Typically, clock designers specify the drift interval based on the anticipated clock drift between the slowest and the fastest cell in a design lot, taking into account part variations, voltage variations, operating temperatures, etc. The designer may specify that a particular design has a maximum drift of, for example, 100 ppm (part per million). That is, for every one million clocks, there is a maximum drift of 100 clocks. Alternatively speaking, after one million clocks, a cell 200, e.g., cell 200(A), may be 100 clocks faster than another cell, e.g., cell 200(B) if this cell 200(B) does not drift. However, because each cell may drift, the drift spread from the fastest and slowest cell is 200 ppm (2×100 ppm). As a result, for every 5,000 (1 million clocks/200 ppm) clocks, a clock drift may occur, and therefore, the drift interval may be selected, in terms of the number of clocks, as 5,000. In an embodiment, a counter, e.g., referred to as the "drift counter," is used to initialize the drift interval, and when this counter expires, e.g., counts to zero, the value of the ar.itc-F is provided to be used by the CPUs-S. The drift interval may be specified in time units, e.g., milli-second, second, etc, or other time interval units, etc.

Depending on implementations, the time it takes for a thread to migrate from one cell 200 to another cell 200 and/or the time it takes to perform a cache transfer is considered in determining the drift interval. For example, if it is determined that a frequency drift would occur in 5,000 clocks, and it takes 10 clocks to migrate a thread, then the drift interval may be selected as 4990 clocks (5000 clocks−10 clocks). Similarly, if it takes 20 clocks to perform a cache transfer, then the drift interval may be selected as 4980 clocks (5000 clocks−20 clocks). A cache transfer is the movement of data from the cache of one CPU to another using the memory coherency protocol of the frontside bus.

Identifying the Fast Cell

Any technique identifying the fastest cell is within the scope of embodiments of the invention. For example, a frequency measurement device, whether hardware or software or a combination thereof, may be used to measure the frequency of the clocks running the cells and thus identify the fastest cell as the fast cell. In an embodiment, a CPU 210 is selected to represent a cell 200; each selected CPU 210 corresponds to a memory location; and all selected CPUs 210 representing the cells 200 in a system, e.g., system 100, start counting to a predefined number, e.g., 10,000, each corresponds to a clock. Once reaching that number 10,000, the CPU 210 writes the result or any number, e.g., a flag, to its corresponding memory location. In the mean time, a CPU, e.g., CPU-C, keeps checking the memory locations, and once the written location is identified, the CPU-C, from that location, identifies the CPU that wrote into that location and that is also the fastest CPU. From the identified fastest CPU, the fastest cell (e.g., fast cell as used in this document) is identified. The predefined number is selected normally large enough such that a drift can occur. Alternatively, each of the selected CPU monitors its own time counts, and when the number 10,000 is reached, the CPU checks with other CPUs to determine the fast(est) CPU. Generally, when a fast CPU reaches the number 10,000, no other CPU would have reached the number, and the fast CPU is therefore identified.

Memory/Cache Coherence

In order for CPUs 210 to quickly access desirable data, CPUs 210 run with different levels of caches 230/2130 and storage areas including memory 220 that are organized in a hierarchy in terms of time taken to provide the data to the requesting CPU 210. The memory or cache coherence protocol includes a directory structure that keeps track of the content of memory locations in cache, the content of each CPU's cache 2130, etc. Accessing data from a cache closer to a CPU 210 takes less time than from a cache/storage area further away from the same CPU 210. Generally, when data is requested from a CPU 210, the data is checked in the cache hierarchy to determine if the data is in one of the caches, e.g., 230, 2130, etc., and if so, the data is provided to the requesting CPU from such cache, rather from memory, e.g., 220, disc and/or other storage medium, because acquiring the data in a cache is generally much faster than from disc or other storage medium including memory.

The cache coherence protocol manages the data requested by a CPU 210 and provides a unified view of the storage element that stores the most updated data for a given memory location. The most updated value of the data could be in memory 220, a cache level 230, a cache 2130 of a CPU 210, other storage areas, etc. Depending on implementations, when a CPU 210 tries to access a memory location, the cache coherence protocol in conjunction with the frontside bus identifies the location having the latest version of the data value associated with that memory location. Regardless of the location of the most updated value, the cache coherence protocol makes available the value to the requesting CPU 210, e.g., providing the value to the cache 2130 of such CPU. The cache coherence protocol includes various protocols such as frontside bus protocol, snoop protocol, etc., that, in turns, includes, I/O write, I/O read, memory read, snoop, responses to memory read, etc.

Incorporating the ar.itc-F into the Cache Coherence Protocol—Aliasing Memory Locations Embodiments of the invention incorporate registers including the ar.itc register into the coherency domain. Embodiments enable these registers to be part of the storage hierarchy and thus subject to the cache coherence protocol. For illustration purposes, the ar.itc-F is incorporated into the cache coherence protocol. As such, embodiments of the invention declare a selected memory location an alias for the ar.itc-F, and notify such alias to all elements in the system including CPUs 210, operating system, cache controller, memory controller, etc. Such declaration may be done by firmware at time of system initialization or by various other mechanisms. Since the aliased memory location is reserved for aliasing the ar.itc-F, this location is not to be used for other purposes. Once the memory location is aliased, ar.itc-F is subject to the cache coherence protocol, and the CPU-F sees the snoop to an explicit memory address aliased to the ar.itc-F. Further, because the aliased memory location is a special location corresponding to the ar.itc-F, when the data from this location is requested, searching for the data may be skipped in caches or other storage areas, and is directed directly to the ar.itc-F. In accordance with embodiments of the invention, there is no change to the cache coherence protocol including the frontside bus protocol. However, changes include the memory map for the coherence protocol and how the cache controller of the CPU-S reads the aliased address, how the CPU-F returns the ar.itc-F value to that aliased address, etc.

The CPU-F and/or the cache controller make decisions such as whether the CPU-F participates in the coherence protocol, whether it returns the ar.itc-F value, etc. In the cache coherence domain language known by those skilled in the art, the CPU-F "owns" the "register line," or the data in the ar.itc-F that corresponds to the aliased memory location is always "valid", "modified", and "owned" by CPU-F. That is, the ar.itc-F stores the most updated data for the aliased memory address. Since the data in ar.itc-F is modified, when this data is requested, the memory controller, in conjunction with the cache coherence protocol and/or frontside bus protocol, takes appropriate actions including allowing the CPU-F to return the data in the ar.itc-F to the requesting CPU, e.g., the CPU-S. For example, when the CPU-F reads the aliased memory address location, the cache controller in CPU-F, recognizing this is a special address corresponding to the ar.itc-F, allows the CPU-F to return the value. If the CPU-F does not return the value of the ar.itc-F, then an error must have occurred, and a system flag is provided accordingly. In an embodiment, when an error occurs, the CPU-F returns a predefined value, such as zero, which appropriately signals error handling from the system. The CPU-S, after a snoop read, acquires the value of ar.itc-F, replaces this value over the value of its ar.itc, clears the invalid flag, and renews the drift interval, e.g., resetting the drift counter.

Incorporating the ar.itc-F into the Cache Coherence Protocol—Creating New Commands Generally, the frontside bus defines the data movements and controls such movements. On a typical frontside bus, there is means to identify transaction types such as IO, memory, cache, etc., and sub-types such as IO read, IO write, memory read, memory write, cache request, cache snoop response, etc. Embodiments of the invention, to incorporate registers into the cache coherence protocols, create a new cache command sub-type for those registers. In effect, the added command with the sub-type provides for a new case of data transfer for the registers. The new sub-type defines a class of registers to be part of the coherent protocol, with the particular register being selected for the protocol by this sub-type without using the memory address portion of the command normally used by a cache coherence protocol. Alternatively speaking, the cache operations on those registers are identified by the command sub-type, and do not refer to any particular memory address. System elements such as the CPUs, operating system, memory controller, cache controller, etc., are provided with information related to this added command, and use this command as appropriate. For example, a CPU-S, when desires to update its ar.itc snoops requests that value by putting on the frontside bus a transaction with a command type and sub-type for that register ar.itc. The cache coherence protocol, based on the command and its sub-type, recognizes this is a command for cache coherence of a register, e.g., register ar.itc, forwards the request to the CPU-F, which, via the cache coherence protocol, appropriately returns the value of register ar.itc-F. Further, when the cache controller recognizes this command as a command related to the ar.itc-F, the cache controller skips searching for the data in the different levels of caches, etc.

In the above illustration, a single register ar.itc is used. However, embodiments of the invention are not limited to ar.itc register or a single register. In case multiple registers are incorporated into the coherence domain, an aliased memory location is reserved and/or a command is created for each register, and each register is incorporated into the cache coherence protocol as described herein.

ar.itc-F and the Cache Coherence Protocol

A CPU-S, when desires to update its ar.itc-S, invalidates its own content, which causes the next read to acquire the ar.itc-F value. Since the ar.itc-F is part of the cache coherence domain, when a CPU-S desires the ar.itc-F value, the CPU-S, in embodiments using the memory-aliased location, reads this aliased memory location, which in effect, results in a cache miss. The CPU-S requests the coherence protocol to provide this value, e.g., by sending a read request to the frontside bus to cause the coherence protocol to snoop on the ar.itc-F. This request corresponds to a value being requested out of the aliased memory location. The cache coherence protocol, from the frontside bus, determines the storage element that owns and stores the most updated value of the aliased memory location. This storage element is in fact the ar.itc-F. Because the fast cell or the CPU-F has the ar.itc-F, none of the CPUs-S would respond that they have such value. The coherence protocol, being able to identify the ar.itc-F, thus passes the request to the fast cell including the CPU-F. The fast cell knows that it has the requested value in one of its CPU selected as CPU-F then allows this CPU-F to respond. At that time, the CPU-F recognizes a snoop request for the most updated data in ar.itc-F, and, in conjunction with the cache coherence protocol, provides the most updated ar.itc-F value to the CPU-S.

In some embodiments, the frontside bus protocol updates the aliased memory location instead of leaving the ar.itc-F as the only storage area having the most updated value corresponding to the aliased memory location, the requesting CPU, e.g., the CPU-S, acquires the ar.itc-F value from this aliased memory locatoin. Alternatively, the CPU-F writes the most updated ar.itc-F value to the aliased memory location and requests that the requesting CPU, e.g., CPU-S, to retry the request, and the CPU-S eventually acquires the ar.itc-F value directly from the aliased memory location. Alternatively, the CPU-S can acquire the data while the most updated ar.itc-F value is in transit to the aliased memory location.

Using the above illustration in embodiments that use the newly-created-command, after the CPU-S uses a command to request a snoop on the ar.itc, the coherence protocol determines the storage element corresponding to the snoop request based on the command and command sub-type. The coherence protocol then passes this request to the CPU-F, which, in conjunction with the coherence protocol, returns the ar.itc-F value, etc.

ALTERNATIVE EMBODIMENT

Embodiment of the invention, when appropriate, e.g., when the drift counter expires at the drift interval, use the synchronization routine by the operating system to synchronize the timer registers. During an SMP system firmware initialization and bring-up to boot, one CPU, e.g., CPU-I, executes the firmware, and other CPUs are held in reset. Therefore, when CPU-I is out of reset, the ar.itc timer of CPU-I starts counting while the ar.itc timers of other CPUs are still in reset and haven't started counting yet. Once the firmware runs to a point where all CPUs are out of reset and start running, the ar.itc of CPU-I runs ahead of ar.itc of other CPUs, resulting in un-synchronization of ar.itc registers. As a result, the operating system initiates a routine to do a one-time synchronization of the ar.itc registers. When the drift counters expires indicating it's time to update ar.itc-S, embodiments of the invention utilize this routine of the operating system to update ar.itc-S of the slow cells. Before using this synchronization routine of operating system, embodiments of the invention weigh the advantages and disadvantages including CPU time in executing this routine because, for example, if the time interval is short, then using this routine can greatly affect system performance.

In the foregoing specification, the invention has been described with reference to specific embodiments thereof. However, it will be evident that various modifications and changes may be made thereto without departing from the broader spirit and scope of the invention. Accordingly, the specification and drawings are to be regarded as illustrative rather than as restrictive.

What is claimed is:

1. A method of updating a slow register, the method comprising:
   identifying a plurality of processing cells each having at least one register;
   identifying a first processing cell as a fast processing cell, and a second processing cell as a slow processing cell;
   identifying a register in the fast processing cell as a fast register and a register in the slow processing cell as the slow register; the fast register being part of a first CPU and the slow register being part of a second CPU different from the first CPU; and
   updating the value of the slow register to a value of the fast register at a time interval.

2. The method of claim 1 wherein a register of the at least one register is part of a CPU.

3. The method of claim 1 wherein a register of the at least one register is a time register.

4. The method of claim 1 wherein identifying a processing cell as a fast processing cell is based on a clock provided to the processing cell to be identified.

5. The method of claim 1 wherein updating the value of the slow register includes providing the value of the fast register to a specified location in memory.

6. The method of claim 5 wherein updating the value of the slow register includes obtaining the value of the fast register from the specified location.

7. The method of claim 1 further comprising:
   returning the value of the fast register upon a request for a value in the memory location selected as an alias for the fast register.

8. The method of claim 1 wherein the incorporating further comprises providing a command having a sub-type associated with transferring a value in the fast register.

9. The method of claim 8 further comprising:
   returning the value of the fast register upon recognizing the provided command.

10. The method of claim 8 further comprising:
    returning the value of the fast register upon recognizing the provided command without searching for the value in different levels of caches.

11. The method of claim 1 wherein the plurality of processing cells are part of a Symmetric Multiprocessing system.

12. The method of claim 1 wherein updating the value of the slow register causes the value of the slow register to increase monotonically.

13. A method of updating a value of a first register of a first CPU, the method comprising:
    identifying a second register of a second CPU different from the first CPU;
    identifying the first register as a slow register and the second register as a fast register;
    providing a memory location as an alias of the second register; and
    using a cache coherence protocol to provide a value of the second register to update a value of the first register in response to a cache miss caused by a value of the memory location being requested.

14. The method of claim 13 further comprising:
    updating the memory location with the value of the second register before providing the value of the second register to update the value of the first register.

15. The method of claim 13 further comprising:
    updating the memory location with the value of the second register;
    re-requesting the value from the memory location; and
    acquiring the value from the memory location to the first register.

16. The method of claim 13 wherein the first CPU is run by a first clock source different from a second clock source running the second CPU.

17. The method of claim 13 wherein the first CPU and the second CPU are part of a Symmetric Multiprocessing system.

18. The method of claim 13 further comprising: determining a period to update the value of the first register so that value increases monotonically.

19. The method of claim 18 wherein the period includes time to migrate a first thread to a second thread and/or time to perform a cache transfer.

20. A method for updating a value of a first register in a first CPU, the method comprising:
    identifying a second register in a second CPU different from the first CPU;
    accessing a command associated with transferring data related to the second register, the command being associated with a cache coherence protocol;
    reading a value of the second register in response to the accessing of the command; and
    using the cache coherence protocol to provide the value of the second register to the first register based on a sub-type of the command.

21. The method of claim 20 wherein the first CPU is run by a first clock source different from a second clock source running the second CPU.

22. The method of claim 20 wherein the first CPU and the second CPU are part of a Symmetric Multiprocessing system.

23. The method of claim 20 further comprising:
determining a period to update the value of the first register so that the value increases monotonically.

24. The method of claim 20 wherein the period includes time to migrate a first thread to a second thread and/or time to perform a cache transfer.

25. A multi-processing system comprising:
a fast CPU having a fast register incorporated into a cache coherence protocol;
a fast clock source running the fast CPU;
a slow CPU having a slow register; and
a slow clock source running the slow CPU;
wherein the cache coherence protocol, at a time period, being used to provide a value in the fast register to the slow register; the time period being selected such that the value in the slow register increases monotonically.

26. The system of claim 25 wherein the fast CPU being on a fast processing cell different from a slow processing cell containing the slow CPU.

27. The system of claim 25 wherein the fast register being incorporated into the cache coherence protocol by having an aliased memory location.

28. The system of claim 25 further comprising program executable instructions to incorporate the fast register into the cache coherence protocol.

29. The system of claim 25 wherein the fast register being visible to an arithmetic logic unit of the fast CPU.

30. The system of claim 25 wherein the fast register and the slow register being time register.

31. The system of claim 25 wherein the time period includes time to switch threads and/or time to perform a cache transfer.

32. The method of claim 1 further comprising:
incorporating the fast register into the cache coherency domain before the updating the value of the slow register to the value of the fast register.

33. The method of claim 1 further comprising:
selecting a memory location as an alias for the fast register.

34. The method of claim 25 wherein the fast register is incorporated into the cache coherence protocol based on a command with a sub-type related to transferring data of the fast register.

* * * * *